United States Patent
Jahnke et al.

(10) Patent No.: US 8,652,694 B2
(45) Date of Patent: Feb. 18, 2014

(54) WATER RECOVERY ASSEMBLY FOR TRANSFERRING WATER FROM FUEL CELL CATHODE EXHAUST

(75) Inventors: Fred C. Jahnke, Rye, NY (US); Joseph M. Daly, Bethel, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1184 days.

(21) Appl. No.: 12/042,231

(22) Filed: Mar. 4, 2008

(65) Prior Publication Data

US 2009/0226775 A1   Sep. 10, 2009

(51) Int. Cl.
*H01M 8/06* (2006.01)

(52) U.S. Cl.
USPC ............... 429/414; 429/413; 429/450

(58) Field of Classification Search
USPC .......................... 429/414, 413, 450
See application file for complete search history.

(56) References Cited

U.S. PATENT DOCUMENTS

| | | | |
|---|---|---|---|
| 4,362,789 A * | 12/1982 | Dighe | 429/414 |
| 4,372,759 A | 2/1983 | Sederquist et al. | |
| 6,171,718 B1 | 1/2001 | Murach et al. | |
| 6,207,306 B1 | 3/2001 | Sederquist | |
| 6,207,308 B1 | 3/2001 | Grasso et al. | |
| 6,759,153 B1 * | 7/2004 | Lamm et al. | 429/437 |
| 6,869,707 B2 | 3/2005 | Edlund et al. | |
| 7,018,732 B2 * | 3/2006 | Cargnelli et al. | 429/415 |
| 7,060,382 B2 | 6/2006 | Jahnke et al. | |
| 7,184,875 B2 | 2/2007 | Ferrall et al. | |
| 2004/0023094 A1 | 2/2004 | Hatayama et al. | |
| 2004/0131902 A1 * | 7/2004 | Frank et al. | 429/21 |
| 2004/0229102 A1 * | 11/2004 | Jahnke et al. | 429/34 |
| 2007/0134526 A1 | 6/2007 | Numao et al. | |
| 2009/0155650 A1 | 6/2009 | Cui et al. | |
| 2011/0250514 A1 * | 10/2011 | Ramaswamy et al. | 429/414 |

FOREIGN PATENT DOCUMENTS

| | | |
|---|---|---|
| JP | 10-321246 | 12/1998 |
| JP | 11-214021 | 8/1999 |
| JP | 11-354133 | 12/1999 |

(Continued)

OTHER PUBLICATIONS

US Publication #2 and foreign (WO) references were cited in a Supplementary European Search Report issued on Dec. 12, 2011, that issued in the corresponding European Patent Application No. 09717213.

(Continued)

*Primary Examiner* — Raymond Alejandro
*Assistant Examiner* — Helen McDermott
(74) *Attorney, Agent, or Firm* — Cowan, Liebowitz & Latman, P.C.

(57) ABSTRACT

A water transfer assembly for use in a fuel cell system having an anode and a cathode, the anode being adapted to receive fuel and to output anode exhaust and the cathode being adapted to receive oxidant gas and to output cathode exhaust, the water transfer assembly comprising a first cooling assembly adapted to receive the cathode exhaust and to quench cool the cathode exhaust to recover a first portion of water including non-volatile contaminants from the cathode exhaust and to output cleansed cathode exhaust and the first water portion, and a second cooling assembly adapted to receive the cleansed cathode exhaust and to recover a second water portion from the cleansed cathode exhaust, the second water portion being suitable for humidifying the fuel supplied to the anode.

29 Claims, 2 Drawing Sheets

(56) References Cited

FOREIGN PATENT DOCUMENTS

| JP | 2002-28589 | 1/2002 |
|---|---|---|
| WO | 01/67530 A2 | 9/2001 |
| WO | 2005/043658 A2 | 5/2005 |

OTHER PUBLICATIONS

US Patent #s 1 and 4 and US Publication #2 references were cited in a Jun. 5, 2009 U.S. Office Action, that issued in U.S. Appl. No. 11/971,663.

US Patent # 3 and US Publication #2 references were cited in a Dec. 29, 2009 U.S. Office Action, that issued in U.S. Appl. No. 11/971,663.

US Publication # 3 reference was cited in a Mar. 25, 2011 U.S. Office Action, that issued in U.S. Appl. No. 11/971,663.

US Patent # 3 and US Publication #s 2-3 references was cited in a Oct. 6, 2011 U.S. Office Action, that issued in U.S. Appl. No. 11/971,663.

US Patent # 2 reference was cited in a Jan. 26, 2012 U.S. Office Action, that issued in U.S. Appl. No. 11/971,663.

* cited by examiner

WATER RECOVERY ASSEMBLY FOR TRANSFERRING WATER FROM FUEL CELL CATHODE EXHAUST

BACKGROUND OF THE INVENTION

This invention relates to water recovery and, in particular, to water recovery for use in high temperature fuel cell systems.

A fuel cell is a device which directly converts chemical energy stored in hydrocarbon fuel into electrical energy by means of an electrochemical reaction. Generally, a fuel cell comprises an anode electrode and a cathode electrode separated by an electrolyte, which serves to conduct electrically charged ions. High temperature fuel cells, such as molten carbonate fuel cells, operate by passing a reactant fuel gas through the anode, while oxidant gas comprising carbon dioxide and oxygen is passed through the cathode.

Reactant gases supplied to the fuel cell, and in particular, the reactant fuel gas supplied to the anode, must be sufficiently humidified to maintain a desired carbon to steam ratio in the fuel for proper and efficient fuel cell operation, to provide sufficient ionic conductivity of the reactant gases and to prevent carbon deposition in the fuel cell. The amount of water consumed by a fuel cell system for humidifying reactant gases is usually significant and requires a continuous supply of water to the fuel cell system.

The electrochemical reaction between the reactant fuel gas and the oxidant gas produces water vapor outputted as part of heated fuel cell exhaust gases including a heated cathode exhaust gas and a heated anode exhaust. In order to limit or eliminate water supplied to the fuel cell system from external sources, it is desired to separate water vapor in the fuel cell exhaust gases from other exhaust components and to recycle the separated water to humidify the reactant gases. An example of a water recycling system is disclosed in U.S. Pat. Nos. 5,068,159 and 4,039,579, which teach using a cooler and condenser to separate water from the anode exhaust stream, and thereafter passing the separated water through a boiler and a heater and feeding the water to the inlet of the anode compartment.

Another U.S. Pat. No. 7,060,382, assigned to the same assignee hereof, discloses a system in which a water transfer assembly in the form of a partial-pressure swing water transfer wheel is used to separate and transfer water vapor in anode exhaust as water to the fuel feed. This patent also discloses a system in which this transfer is carried out by using heat exchangers where the anode exhaust is cooled by the oxidant supply gas, water recycle vaporization and/or a cooling water or an air fan. After being cooled, the stream is fed to a scrubbing and blow-down assembly where the electrolyte contaminated water is removed. The resultant stream is then further cooled in a heat exchanger by an air fan or cooling water and the stream then fed to a condensing unit. At this unit, the water is removed and fed to the fuel feed, while the stream is further fed to a carbon dioxide transfer assembly.

Many conventional systems for separating water in the fuel cell exhaust employ complex and costly cooling systems for cooling of the hot anode exhaust gas leaving the fuel cell in order to condense a sufficient amount of water from the exhaust. Such cooling of the anode exhaust in conventional systems results in power consumption, increasing the operating costs of the system and complicates the pressure balance between the anode and the cathode. Typically, anode exhaust is not separately removed from the fuel cell compartment, and thus, implementing anode exhaust cooling requires special piping which cannot be easily added to an existing system. Cathode exhaust is normally vented to the atmosphere and water recovery from the cathode exhaust stream may be accomplished without impacting the typical operation of a fuel cell and can be easily retrofitted on existing units. It also works well with units which recover heat from the cathode exhaust since heat recovery assists in cooling the exhaust. Some systems transfer water from the anode exhaust since cathode exhaust gas requires greater cooling than the anode exhaust to transfer a sufficient amount of water due to the presence of spent oxidant gas in the cathode exhaust. In particular, the anode exhaust typically has to be cooled to about 140° F. to condense a sufficient amount of water, while the cathode exhaust has to be cooled to about 115° F. Nevertheless, because of the ease of installation, particularly when cathode exhaust is used in water recovery systems with waste heat recovery, water cathode exhaust water recovery systems are often preferred.

It is therefore an object of the present invention to provide an improved water transfer assembly capable of separating and transferring water from cathode exhaust gases without requiring significant power for operation and without requiring complex cooling equipment integrated into the fuel cell system.

It is another object of the present invention to provide a water transfer assembly which produces water free of electrolyte contamination, thus eliminating the need for a water treating system.

It is a further object of the present invention to provide a water transfer assembly which results in greater manufacturing and operating efficiencies in the fuel cell system.

SUMMARY OF THE INVENTION

The above and other objectives are realized in a water transfer assembly for use in a fuel cell system having an anode and a cathode, with the anode being adapted to receive fuel and to output anode exhaust and the cathode being adapted to receive oxidant gas and to output cathode exhaust. The water transfer assembly comprises a first cooling assembly and a second cooling assembly, wherein the first cooling assembly is adapted to receive the cathode exhaust and to quench cool the cathode exhaust to recover a first water portion including non-volatile contaminants from the cathode exhaust and to output cleansed cathode exhaust and the first water portion, and the second cooling assembly is adapted to receive the cleansed cathode exhaust and to recover a second water portion from the cleansed cathode exhaust suitable for humidifying the fuel supplied to the anode.

In certain embodiments, the first cooling assembly comprises a cooling path for passing the cathode exhaust and being adapted to receive spray water for cooling the cathode exhaust and producing the first water portion. The first cooling assembly also comprises a first separating member for separating the first water portion from the cathode exhaust and outputting the first water portion and the cleansed cathode exhaust. In some embodiments, the first cooling assembly further comprises a blowdown assembly for removing non-volatile contaminants, including electrolyte, from the first water portion outputted by the first separating member and for then outputting the first water portion as spray water to the cooling path. In some embodiments, the first separating member is also adapted to receive a portion of the second water portion and/or supplemental water from an external water supply for quenching and cleaning the cathode exhaust. Supplemental water is typically only needed on hot days when cooling of the cathode exhaust to the desired temperature for water recovery is impractical. Supplemental water may be processed using a filter to remove chlorine and volatile contaminants before passing supplemental water to the first separating member to avoid contaminating the water in the second cooling assembly.

The second cooling assembly comprises a cooling member for cooling the cleansed cathode exhaust and condensing the second water portion from the cleansed cathode exhaust and a second separating member for separating the second water portion from the cleansed cathode exhaust. In certain embodiments, the cooling member comprises an airfan, and each of the first and second separating members comprise a knock out pot.

A fuel cell system including the water transfer assembly for transferring water from the cathode exhaust and for using at least a portion of the second water portion for humidifying the fuel supplied to the anode is also disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
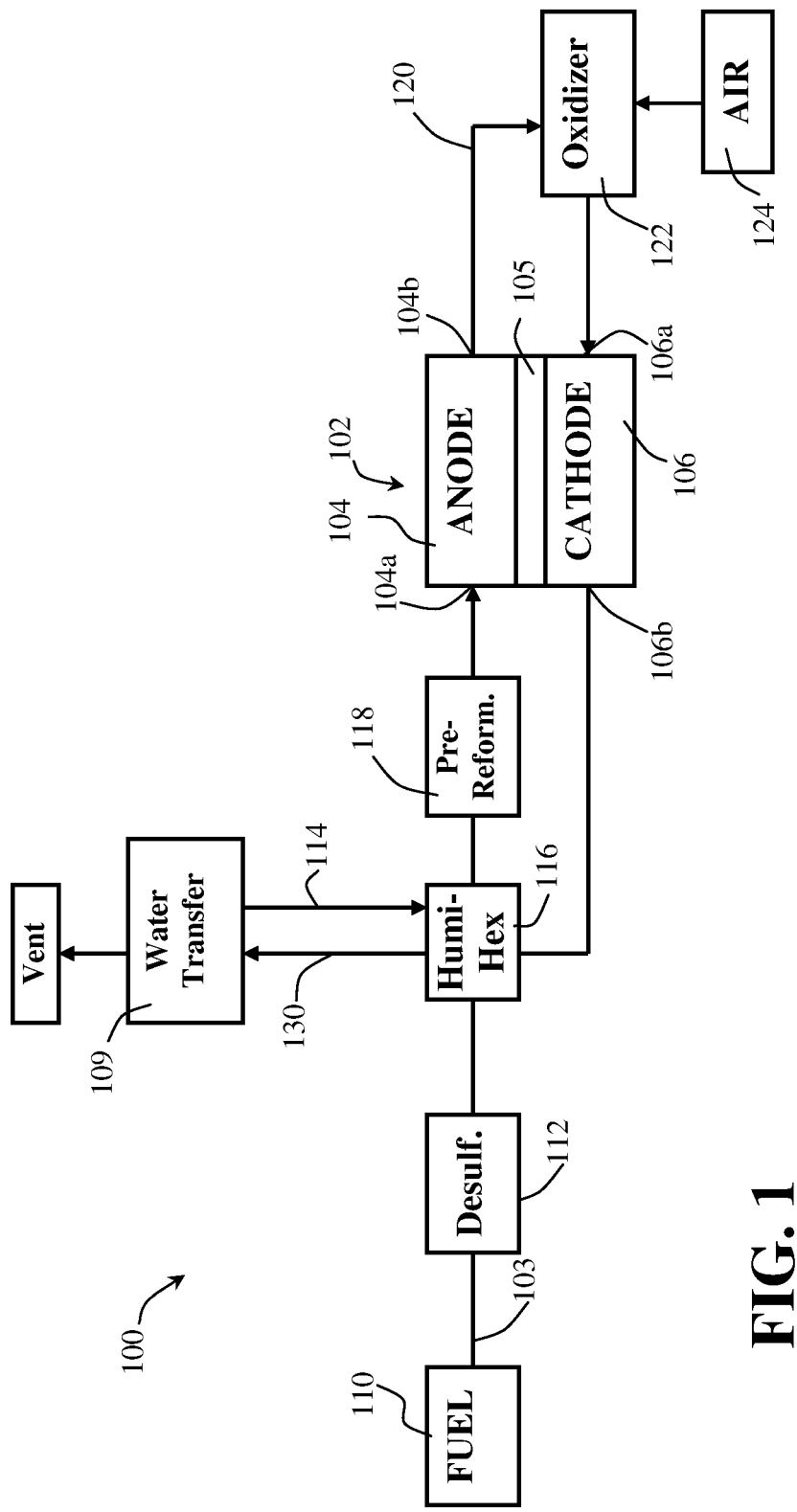
FIG. 1 shows a block diagram of a fuel cell system using a water transfer assembly for transferring water from cathode exhaust.

FIG. 1 shows a fuel cell system 100 comprising a fuel cell stack 102 including an anode side 104, adapted to receive fuel from a fuel supply path 103 and to output anode exhaust, and a cathode side 106 adapted to receive oxidant gas and to output cathode exhaust, and a water transfer assembly 109 for transferring water in the cathode exhaust to humidify the fuel in the fuel supply path 103 and for outputting water-separated cathode exhaust. More particularly, the fuel cell stack 102 of the system 100 comprises at least one fuel cell having the anode side or compartment 104 and the cathode side or compartment 106, separated by an electrolyte matrix 105. A hydrocarbon containing fuel is supplied from a fuel supply 110 to a fuel supply path 103 which carries the fuel through a desulfurizer 112 to remove sulfur-containing compounds present in the fuel. The desulfurizer 112 comprises one or more sulfur-adsorbent or sulfur-absorbent materials through which the fuel flows and which adsorb or absorb sulfur-containing compounds in the fuel.

After being passed through the desulfurizer 112, the fuel in the supply line 103 is conveyed to a humidifier/heat exchanger assembly 116 which is adapted to receive water from the water transfer assembly 109 via a water supply line 114. In the humidifier/heat exchanger assembly 116, the fuel is mixed with water to produce humidified fuel and pre-heated to a predetermined temperature using hot cathode exhaust. The pre-heated humidified fuel is then passed through a deoxidizer/preconverter or prereformer assembly 118, which removes any trace oxygen and heavy hydrocarbon contaminants from the fuel. Although not shown in FIG. 1, after passing through the deoxidizer/preconverter or prereformer unit 118, the fuel may be further heated by cathode exhaust or by anode exhaust. The pre-heated deoxidized humidified fuel is then supplied to the anode side 104 of the fuel cell through an inlet 104a.

Fuel entering the anode side 104 is reformed therein to produce hydrogen and carbon monoxide and undergoes an electrochemical reaction with oxidant gas passing through the cathode side 106 to produce electrical power and water. Anode exhaust produced in the anode 104 leaves the fuel cell 102 through an anode outlet 104b to an anode exhaust path 120. The anode exhaust in the exhaust path 120 comprises unreacted fuel, including hydrogen and carbon monoxide, water vapor, carbon dioxide, electrolyte vapor and trace amounts of other gases. The anode exhaust is conveyed by the exhaust path 120 to an oxidizer 122, which also receives oxidant gas in the form of air from an air supply 124. Although not shown in FIG. 1, the anode exhaust may be passed through a heat exchanger to pre-heat fuel, water and/or oxidant gas supplied to the fuel cell system 100 before being conveyed to the oxidizer 122.

In the oxidizer 122, oxidant gas is mixed with the anode exhaust and combusted to produce heated oxidant gas comprising oxygen, nitrogen, water vapor and carbon dioxide. Heated oxidant gas leaving the oxidizer 124 is thereafter conveyed to the cathode side 106 through a cathode inlet 106a.

After undergoing the electrochemical reaction with the fuel in the anode, the cathode side 104 outputs cathode exhaust comprising the same constituents as the cathode inlet gas, i.e. oxygen, nitrogen, water vapor and carbon dioxide, but with depleted concentrations of oxygen and carbon dioxide, and also including electrolyte contaminants. Cathode exhaust exits the cathode 106 through a cathode outlet 106b and is then passed to the humidifier/heat exchanger assembly 116 for pre-heating the fuel and water mixture. The cathode exhaust is thereafter passed from the humidifier/heat exchanger assembly 116 to the water transfer assembly 109 in which the cathode exhaust gas is cooled and water is separated from the other components of the cathode exhaust. As discussed herein below, the water transfer assembly condenses the water in the cathode exhaust gas in two stages, such that a first portion of water contaminated with electrolyte is produced in a first stage and clean water is condensed from the cathode exhaust in a second stage.

Figure 2:
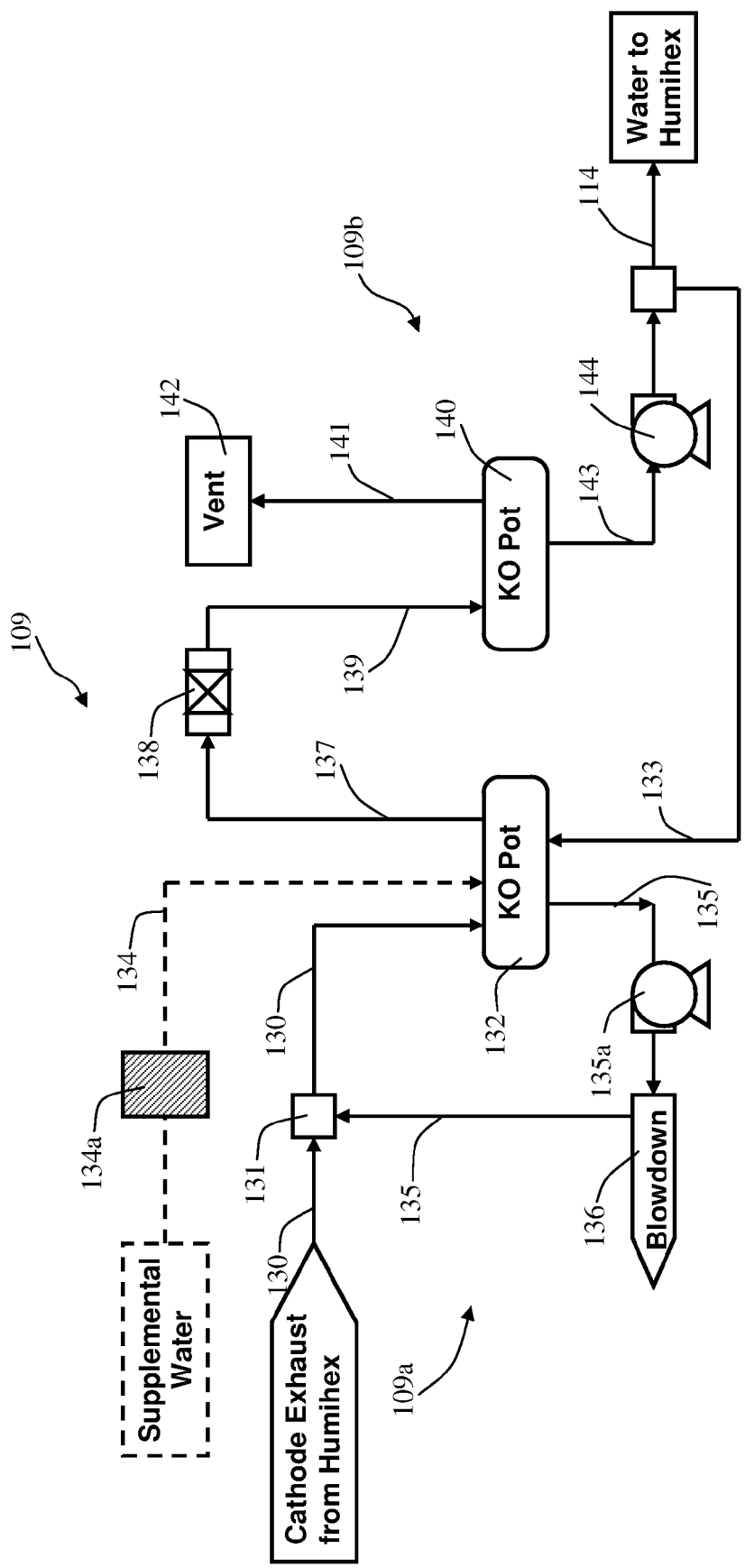
FIG. 2 shows a detailed view of the water transfer assembly of FIG. 1.

The construction of the water transfer assembly is shown in FIG. 2 and will be described in more detail herein below. Clean water separated from the cathode exhaust in the water transfer assembly is passed to the water supply path 114 and thereafter passed to the humidifier/heat exchanger 116 for humidifying the fuel. Separated cathode exhaust is outputted by the water transfer assembly 109 and exported out of the system 100 through a vent 142.

FIG. 2 shows a more detailed schematic view of the water transfer assembly 109 of FIG. 1. The water transfer assembly 109 condenses water vapor present in the cathode exhaust in two stages to remove electrolyte contaminated water in a first stage and to recover substantially electrolyte-free water from the cathode exhaust in a second stage. As shown, the water transfer assembly 109 includes a first cooling assembly 109a for quench cooling the cathode exhaust and recovering and removing with water electrolyte contaminates from the cathode exhaust in the first stage and for outputting cleansed cathode exhaust, which is free or substantially free of electrolyte contaminants, and a second cooling assembly 109b adapted to receive the cleansed cathode exhaust and to recover and remove water that is free, or substantially free, of electrolyte contaminants from the cleansed cathode exhaust.

As shown in FIG. 2, the first cooling assembly 109a includes a cooling path 130 and a first separating member 132. The cooling path 130 quench cools the cathode exhaust therein while conveying the cathode exhaust from the humidifier/heat exchanger assembly to the first separating member 132. As shown, the cooling path 130 receives a predetermined amount of water, in the form of injected spray water, which is sufficient to recover a first water portion containing electrolyte contaminants, as well as other non-volatile contaminants and salts, from the cathode exhaust. The predetermined amount of spray water is injected into the hot cathode exhaust that flows through the cooling path 130 at a predetermined location via an injector 131.

The spray water injected into the cooling path 130 is partially vaporized and the heat of vaporization cools the cathode exhaust. The temperature of the cathode exhaust may vary from 1000° F. to 200° F. depending on the fuel cell operation and the amount of cooling and heat recovery upstream of the cathode water recovery system 109. After being quenched by spray water in the cooling path 130, the cathode exhaust is cooled to a temperature below 200° F. in the cooling path 130 and preferably is cooled to a temperature in the range of 150-180° F. Also, the amount of water spray is such that a portion remains un-volatized and entraps the electrolyte and other contaminants in the cathode exhaust to form the first water portion.

The cathode exhaust and first water portion are separated in a first separating member 132. In the embodiment shown in FIG. 2, the first separating member comprises a knock out pot, which in this illustrative embodiment comprises a vessel large enough to sufficiently reduce the gas velocity of the cathode exhaust so that gravity causes the water phase of the mixed phase stream to separate from the gas. However, it is understood that other water separating devices may be suitable for use as the first separating member to separate the first water portion from the cathode exhaust.

In the embodiment shown in FIG. 2, the first separating member 132 also receives quench water from a quench water supply path 133 to replace the water which was vaporized during the quench cooling in the first separating member 132 and conveyed as vapor to path 137 and to further cool the cathode exhaust.

In certain embodiments, the first separating member 132 also receives supplemental water from a supplemental water supply path 134 for replacing the water which was vaporized during the quench cooling in the first separating member 132 and conveyed as vapor to path 137 and for further cooling of the cathode exhaust. In particular, supplemental water may be needed during operation on very hot days when cooling of the cathode exhaust to a desired temperature is more difficult to accomplish. In addition, supplemental water may be needed during zero power or low power operation of the fuel cell system, during which less water is produced in the fuel cell and the cathode exhaust has to be cooled to a lower temperature to recover sufficient water in the second stage. For example, during hot stand-by operation of the fuel cell system, supplemental water is provided to the first separating member at a rate of about 4.4 gallons per hour per stack to produce about 5.9 gallons per hour per stack of water separated as the second water portion. As shown in FIG. 2, prior to being supplied to the first separating member 132, the supplemental water may be passed through a filter 134a for removing chlorine and any volatile contaminants present in the supplemental water. A carbon filter is suitable for use as the filter 134a. Alternatively, the filter 134a may be located in path 114 where the amount of volatile impurities may be lower due to removal of some impurities with vent gas via path 141.

In some embodiments, the supplemental water may be passed through another filtration device to remove non-volatile contaminants. However, such filtration device is not required in the water transfer assembly 109 of FIG. 2 because the second water portion recovered from the cathode exhaust, which may include all or a portion of the supplemental water added to the first separating member 132, is vaporized in path 137 before being condensed in a cooling member 138 and a second separating member 140 and supplied to the humidifier/heat exchanger assembly via path 114. By adding the supplemental water to the first separating member 132 at the first cooling stage, the supplemental water, or a portion thereof, is vaporized during the quench cooling in the first separating member 132 and can be recovered without non-volatile contaminants in the second separating member 140 at the second cooling stage. This allows the system to recover the needed water during all operating modes without requiring removal of the non-volatile salts in the supplemental water.

The first water portion separated in the first separating member 132 is outputted to a recycle path 135. In most embodiments, the recycle path 135 includes a pump 135a to convey the first water portion through the recycle path 135. In the embodiment shown in FIG. 2, the first water portion, which is contaminated with electrolyte and other contaminants, is cleaned using a water blowdown technique 136 to remove the contaminants from the system and to prevent build-up of contaminants. The water is then recycled to the cooling path 130 to form the spray water injected into the hot cathode exhaust by the injector 131.

As shown in FIG. 2, after the first water portion is separated from the cathode exhaust, the cleansed cathode exhaust is outputted to the second cooling assembly 109b through a connecting line 137. In particular, the connecting line 137 conveys the cleansed cathode exhaust to a cooling member 138 which cools the cleansed cathode exhaust to a predetermined temperature and condenses most of the water from the cleansed cathode exhaust. The predetermined temperature to which the cleansed cathode exhaust is cooled is such that a sufficient amount of water in the cleansed cathode exhaust is condensed as the second water portion. In the embodiment shown, the cooling member 138 is in the form of an airfan cooler which cools the cleansed cathode exhaust to the temperature of about 110 to 120° F. during high-power operation of the system. However, during zero or low-power operation of the system, such as a hot stand-by operation, of the system, the cleansed cathode exhaust is cooled to about 88° F. so as to recover sufficient water for the system requirements. If cooling to this temperature level is impractical, supplemental water may be added to the first separating member 132 in the first cooling stage so as to increase the temperature to which the cleansed cathode exhaust must be cooled to recover a sufficient amount of water.

After being cooled by the cooling member 138, cooled cleansed cathode exhaust is passed to a second separating member 140 through a connecting path 139. The second separating member 140 in this illustrative embodiment comprises a knock out pot capable of separating the second water portion from the cooled cleansed cathode exhaust. However, other water separating devices may be suitable for use as the second separating member. The second separating member 140 separates the second water portion from the cleansed cathode exhaust and outputs separated cathode exhaust to an export path 141 which conveys the separated cathode exhaust to a vent 142 out of the fuel cell system.

The second water portion separated by the second separating member from the cleansed cathode exhaust is outputted to a separated water connecting path 143. A pump 144, or a similar device, may be used in the separated water connecting path 143 to convey the second water portion through the connecting path 143 at a desired flow rate. Although not shown in FIG. 2, a filter, such as a carbon filter, may also be used in the connecting path 143 or in the path 114 to remove any volatile contaminants from the second water portion and to eliminate the need for the filter 134a in the path 134. From the connecting path 143, all or a portion of the second water portion is conveyed to the water supply path 114 which supplies the water to the humidifier/heat exchanger assembly.

In the illustrative embodiment shown in FIG. 2, a predetermined portion of the second water portion is passed from the connecting path 143 to the quench water supply path 133 for use as the quench water in the first separating member 132. The remaining portion of the second water portion is passed from the connecting path 143 to the water supply path 114. Moreover, although not shown in FIG. 2, any excess water separated as the second water portion from the cathode exhaust may be stored for future use as the supplemental water, when needed, or for exporting out of the system. In such cases, the first or the second separating member 132 or 140 may be used to store the excess water for future use.

The water transfer assembly 109 of FIG. 2 effectively cools the cathode exhaust to condense a sufficient amount of water from the cathode exhaust so as to allow water-independent or substantially water-independent operation of the fuel cell system. The configuration of the water transfer assembly 109 results in operating and manufacturing cost savings. In particular, the cathode exhaust is cooled to a temperature below 200° F. before being passed to the airfan used as the cooling member. As a result, the maximum temperature of the exhaust supplied to the airfan is limited and the costs of the airfan and of its operation are reduced. Moreover, the risk of damage to the airfan due to thermal stresses is reduced by limiting the maximum temperature of the exhaust provided to the airfan.

Moreover, the water transfer assembly 109 of FIG. 2 is capable of providing water free or substantially free of electrolyte contamination by removing electrolyte-contaminated water in the first cooling assembly 109a. As a result, complex and expensive equipment used for treating separated water in conventional systems so as to remove electrolyte contaminants from the water is eliminated, resulting in greater reliability and efficiency of the fuel cell system.

Although not shown in FIG. 1, waste heat can be recovered from the fuel cell system in order to increase the system's overall efficiency. Such waste heat recovery may be incorporated into the cathode water recovery. In particular, high levels of heat may be recovered from the cathode exhaust gas in the path 130 and may be used for pre-heating other gasses, such as the inlet fuel, in the system. Such heat recovery would reduce the temperature of the cathode exhaust gas provided to the water recovery assembly 109 to a lower temperature range. As a result, the size of the cooler 138 may also be reduced. However, the heat recovery would not otherwise impact the water recovery system operation. Similarly, heat recovery can be incorporated into the cooler 138 if lower temperature heat recovery is desired such that the cooler 138 functions as a heat exchanger. Another option for heat recovery may be to cool the recycle quench water in path 135 using, for example, a heat exchanger. Although heat recovery from the recycle quench water only allows lower temperature heat recovery, such heat recovery allows heat recovery from a water stream downstream of a pump 135a so as to allow low cost, conveniently located heat recovery.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A water transfer assembly incorporated into a molten carbonate fuel cell system having an anode and a cathode, said anode being structured to receive fuel and to output anode exhaust and said cathode being structured to receive oxidant gas and to output cathode exhaust, said water transfer assembly comprising:
   a first cooling assembly comprising a cooling path that receives said cathode exhaust and spray water and quench cools the cathode exhaust using the spray water, an injector for injecting the spray water into the cathode exhaust in the cooling path, and a first separating member for separating a first water portion and non-volatile contaminants from said cathode exhaust and outputting cleansed cathode exhaust and said first water portion, wherein said first cooling assembly processes the first water portion to remove the non-volatile contaminants from the first water portion and recycles the first water portion after processing for use as the spray water; and
   a second cooling assembly comprising a cooling member that receives said cleansed cathode exhaust and cools the cleansed cathode exhaust, and a second separating member that separates a second water portion from said cleansed cathode exhaust, said second water portion being suitable for humidifying said fuel supplied to said anode, and said cooling member comprising one of an air fan and a heat exchanger recovering waste heat from the cleansed cathode exhaust,
   wherein the cleansed cathode exhaust has a temperature below 200° F. before being conveyed to the cooling member of the second cooling assembly, and
   wherein the water transfer assembly is part of a molten carbonate fuel cell system.

2. The water transfer assembly in accordance with claim 1, wherein said first cooling assembly further comprises a blow-down assembly for removing said non-volatile contaminants from said first water portion outputted by said first separating member and then outputting the processed first water portion as said spray water to said cooling path.

3. The water transfer assembly in accordance with claim 2, wherein said first separating member is adapted to receive at least one of a portion of said second water portion and supplemental water for quenching and cleansing said cathode exhaust to produce said cleansed cathode exhaust.

4. The water transfer assembly in accordance with claim 2, wherein said first cooling assembly further comprises a heat exchanger for cooling said spray water before adding said spray water to said cathode exhaust.

5. The water transfer assembly in accordance with claim 2, wherein said first separating member is adapted to receive supplemental water for quenching and cleansing said cathode exhaust to produce said cleansed cathode exhaust, the water transfer assembly, further comprising a filter for removing chlorine and volatile contaminants from said supplemental water.

6. The water transfer assembly in accordance with claim 1, wherein each of said first separating member and said second separating member comprises a knock out pot.

7. The water transfer assembly in accordance with claim 1, wherein a first portion of said second water portion separated by said second separating member is provided to said first separating member for quenching said cathode exhaust and a second portion of said second water portion is provided to a humidifier for humidifying said fuel for said anode.

8. The water transfer assembly in accordance with claim 1, further comprising a filter for removing chlorine and volatile contaminants from said second water portion used for humidifying said fuel supplied to said anode.

9. The water transfer assembly in accordance with claim 1, wherein said non-volatile contaminants comprise electrolyte.

10. The water transfer assembly in accordance with claim 1, wherein the cooling member comprises an air fan and the cooling member cools the cleansed cathode exhaust to a temperature of about 110 to 120° F. during high-power operation of the molten carbonate fuel cell system and to a temperature of about 88° F. during zero or low power operation of the molten carbonate fuel cell system.

11. A molten carbonate fuel cell system comprising:
at least one molten carbonate fuel cell including an anode for receiving fuel and outputting anode exhaust and a cathode for receiving oxidant gas and outputting cathode exhaust;
a humidifier assembly for humidifying said fuel supplied to said anode; and
a water transfer assembly comprising a first cooling assembly including a cooling path that receives said cathode exhaust and spray water and quench cools the cathode exhaust using the spray water, an injector for injecting the spray water into the cathode exhaust in the cooling path, and a first separating member for separating a first water portion and non-volatile contaminants from said cathode exhaust and outputting cleansed cathode exhaust and said first water portion, wherein said first cooling assembly processes the first water portion to remove the non-volatile contaminants from the first water portion and recycles the first water portion after processing for use as the spray water; and a second cooling assembly including a cooling member that receives said cleansed cathode exhaust and cools the cleansed cathode exhaust, and a second separating member that separates a second water portion from said cleansed cathode exhaust, said second water portion being suitable for humidifying said fuel supplied to said anode and said cooling member comprising one of an air fan and a heat exchanger recovering waste heat from the cleansed cathode exhaust,
wherein the cleansed cathode exhaust has a temperature below 200° F. before being conveyed to the cooling member of the second cooling assembly.

12. The molten carbonate fuel cell system in accordance with claim 11, wherein said first cooling assembly further comprises a blowdown assembly for removing said non-volatile contaminants from said first water portion outputted by said first separating member and then outputting said processed first water portion as spray water to said cooling path.

13. The molten carbonate fuel cell system in accordance with claim 12, wherein said first separating member is adapted to receive at least one of a portion of said second water portion and supplemental water for quenching said cathode exhaust.

14. The molten carbonate fuel cell system in accordance with claim 12, wherein said first cooling assembly further comprises a heat exchanger for cooling said spray water before adding said spray water to said cathode exhaust.

15. The molten carbonate fuel cell system in accordance with claim 12, wherein said first separating member is adapted to receive supplemental water for quenching and said cathode exhaust and, wherein said water transfer assembly further comprises a filter for removing chlorine and volatile contaminants from said supplemental water.

16. The molten carbonate fuel cell system in accordance with claim 11, wherein each of said first separating member and said second separating member comprises a knock out pot.

17. The molten carbonate fuel cell system in accordance with claim 11, wherein a first portion of said second water portion separated by said second separating member is provided to said first separating member for quenching said cathode exhaust and a second portion of said second water portion is provided to a humidifier for humidifying said fuel for said anode.

18. The molten carbonate fuel cell system in accordance with claim 11, further comprising a filter for removing chlorine and volatile contaminants from said second water portion used for humidifying said fuel supplied to said anode.

19. The molten carbonate fuel cell system in accordance with claim 11, wherein said non-volatile contaminants comprise electrolyte.

20. The molten carbonate fuel cell system in accordance with claim 11, wherein the cooling member comprises an air fan and the cooling member cools the cleansed cathode exhaust to a temperature of about 110 to 120° F. during high-power operation of the molten carbonate fuel cell system and to a temperature of about 88° F. during zero or low power operation of the molten carbonate fuel cell system.

21. A method of transferring water from cathode exhaust outputted by a cathode of a molten carbonate fuel cell comprising:
receiving cathode exhaust from said cathode and spray water in a cooling path of a first cooling assembly by injecting the spray water using an injector into the cathode exhaust in the cooling path;
quench cooling the cathode exhaust using the spray water in the cooling path;
separating a first water portion and non-volatile contaminants from said cathode exhaust in a first separating member of said first cooling assembly and outputting cleansed cathode exhaust and said first water portion,
processing the first water portion to remove the non-volatile contaminants from the first water portion and recycling the first water portion for use as the spray water;
receiving said cleansed cathode exhaust in a cooling member of a second cooling assembly and cooling said cleansed cathode exhaust, said cooling member comprising one of an air fan and a heat exchanger recovering waste heat from the cleansed cathode exhaust; and
separating a second water portion from said cleansed cathode exhaust in a second separating member of said second cooling assembly, said second portion of water being suitable for humidifying fuel supplied to the anode of said fuel cell,
wherein the cleansed cathode exhaust has a temperature below 200° F. before being received in said cooling member of the second cooling assembly, and
wherein said method of transferring water from cathode exhaust is employed in the molten carbonate fuel cell system.

22. The method of transferring water from cathode exhaust in accordance with claim 21, wherein:
said processing comprises removing said non-volatile contaminants from said first water portion output in the separating step and then outputting the processed first water portion as said spray water to said cathode exhaust.

23. The method of transferring water from cathode exhaust in accordance with claim 22, wherein:
said separating said second water portion includes receiving at least one of a portion of said second water portion and supplemental water for quenching said cathode exhaust.

24. The method of transferring water from cathode exhaust in accordance with claim 23, further comprising removing chlorine and volatile contaminants from at least one of said supplemental water and said second water portion.

25. The method of transferring water from cathode exhaust in accordance with claim 21, further comprising cooling said spray water before adding said spray water to said cathode exhaust.

26. The method of transferring water from cathode exhaust in accordance with claim 21, wherein:
said separating said first water portion and said separating said second water portion are each carried out with a knock out pot.

27. The method of transferring water from cathode exhaust in accordance with claim 21, wherein:
a first portion of said second water portion is received in said separating said first water portion for quenching said cathode exhaust and a second portion of said second water portion is provided to a humidifier for humidifying said fuel for said anode.

28. The method of transferring water from cathode exhaust in accordance with claim 21, wherein:
said non-volatile contaminants comprise electrolyte.

29. The method of transferring water from cathode exhaust in accordance with claim 21, wherein the cooling member comprises an air fan and the cooling member cools the cleansed cathode exhaust to a temperature of about 110 to 120° F. during high-power operation of the molten carbonate fuel cell system and to a temperature of about 88° F. during zero or low power operation of the molten carbonate fuel cell system.

* * * * *